Nov. 5, 1935.  M. MARTHINSEN  2,020,263
LUBRICATING APPARATUS
Filed July 21, 1931
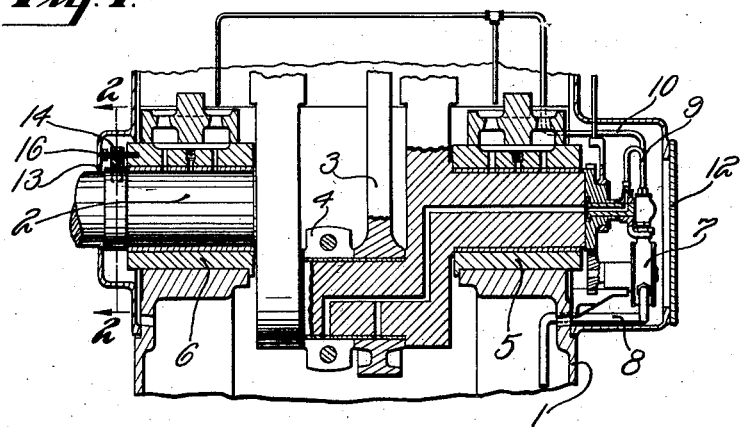
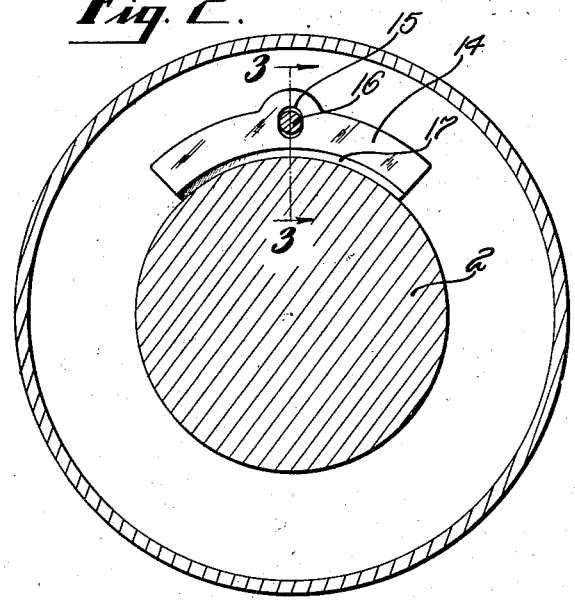
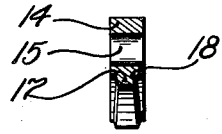
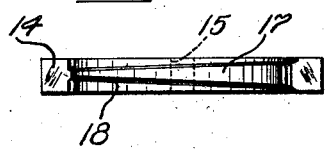
INVENTOR:
MADS MARTHINSEN.
BY
ATT'Y.

Patented Nov. 5, 1935

2,020,263

UNITED STATES PATENT OFFICE 2,020,263

LUBRICATING APPARATUS

Mads Marthinsen, Michigan City, Ind., assignor to Sullivan Machinery Company, a corporation of Massachusetts Application July 21, 1931, Serial No. 552,214

10 Claims. (Cl. 184—6)

My invention relates to lubricating apparatus, and more particularly to devices for preventing undesired passage of lubricant along lubricated shafts.

In many machines it is essential to provide some means for preventing the passage of lubricant in an undesired manner along rotating shafts. For example, in the case of motors it is desirable to prevent the lubricant from passing along the armature shafts and reaching the windings and there injuring the insulation. In many other cases it is desirable to prevent lubricant creeping along the shafts and passing to the outside of the frame of the machine. Other instances where this problem is confronted will suggest themselves to those skilled in this art. It is an object of the present invention to provide improved means to prevent the passage of lubricant along rotating shafts beyond any desired limit. It is a more specific object of the present invention to provide an improved means cooperating with a rotating shaft for not only preventing the passage of lubricant beyond the desired point in the length of the shaft, but also to effect the return of the lubricant to a sump, from which it may be again drawn for use in effecting the lubrication of the machine of which the shaft forms a part. Other objects and advantages of the invention will hereinafter more fully appear.

In the accompanying drawing, in which one illustrative embodiment of the invention is shown for the purposes of illustration,—

Fig. 1 is a central vertical section through the crank shaft, bearings and frame of a machine in which my invention in its illustrative form is incorporated;

Fig. 2 is an enlarged sectional view on the plane of line 2—2 of Fig. 1;

Fig. 3 is a transverse section on a plane corresponding to the line 3—3 of Fig. 2, and Fig. 4 is a bottom elevational view of the illustrative form of my improved lubricant scraping device.

For purposes of illustration, my invention is shown employed in conjunction with a compressor, and the frame of the compressor is shown at 1. Its crank shaft 2 actuates connecting rods 3, 4 and is supported in suitable bearings 5, 6. A gear driven pump 7 draws oil from a sump (not shown) in the bottom of the main frame of the machine, through a suction line 8, and discharges it through connections 9, 10 to lubricate the connecting rod bearings and the crank shaft bearings. The frame of the machine 1 is closed at its right-hand side, in Fig. 1, by a cover plate 12, and there is no possibility of leakage to the exterior of the frame at that side of the machine. At the other side, however, by reason of the fact that either a flywheel with belt drive or a direct connected motor drive, or some other mode of power transmission to the crank shaft, is necessary, it is essential that the shaft project through the side of the machine frame; and to permit this, an opening 13 is provided through which the shaft extends.

In the absence of provision for preventing that undesirable result, lubricant supplied to the bearing 6 would gradually work along the shaft 2, toward the left in Fig. 1, and escape from the interior of the machine frame. For the purpose of preventing this lubricant escape, I have provided improved means riding upon the crank shaft for preventing the lubricant from passing along the latter as far as the opening 13. In a preferred form, this means includes an oil scraper 14 which is of a generally arcuate shape and is provided with an elongated opening 15 through which a machine screw or bolt 16 may pass to prevent the undesired displacement of the oil scraper while permitting it freely to float or ride upon the top of the crank shaft. The scraper 14 is provided upon its inner periphery with a tapering, inwardly projecting flange 17 formed of nearly the full width of the scraper block at one end (its rearward end) and of considerably reduced width at the other (its leading end), the sides of the flange being slightly beveled, as at 18. The curvature of the flange 17 is made the same as that of the shaft 2 with which it is to cooperate, so that it smoothly fits the shaft throughout its length. The helix angles, so to speak, of the scraping edges are very small, and it will be noted that they lie at opposite sides of a plane perpendicular to the axis of the shaft with which the scraper cooperates and bisecting the scraper. A suitable material for the scraper is a mixture of lead and antimony. This will result in the necessary weight, will prevent wear of the shaft, and will permit very smooth running engagement. The scraper block 14 being supported in position upon the shaft with the shaft rotating toward the narrow end of the flange 17, the oil will obviously be deflected back toward the center of the shaft, and will, moreover, at the wide end of the flange tend to be displaced in sufficient quantities so that it will drop from the shaft back into the sump of the machine. It will be obvious that the lubricant which has been plowed back, as it were, toward the center of the shaft, will have a tendency to flow again toward the outer end of the shaft, but the taper of the scraper is so designed that during a single revolution of the shaft it will be impossible for the lubricant to flow beyond the narrow end of the scraper flange 17, which is farther from the middle of the shaft than the wide end of the flange. By reason of the conformity of the curvature of the scraper to that of the shaft, the shaft will be effectually scraped and cleaned of the lubricant, and by reason of the pressing together of the lubricant in increasing quantities toward the thick end of the flange 17, the centrifugal force of the larger mass will be sufficient to effect detachment of a part of the oil and its return to the crank case sump. The scraper constantly operates to clean and scrape the shaft throughout its entire length, and may obviously be placed in different positions, although the one shown is probably the most desirable.

While I have in this application specifically described one form which my invention may assume in practice, it will be understood that this form is shown for purposes of illustration only, and that the invention may be modified and embodied in various other forms without departing from its spirit or the scope of the appended claims.

What I claim as new and desire to secure by Letters Patent is:—

1. In combination, a rotating lubricated shaft, and scraper means floating upon the upper portion of said shaft and of the same curvature as said shaft throughout its engagement therewith and having a relatively upright lateral deflecting edge of substantial height at each end thereof and extending substantially helically with respect to the shaft and substantially coextensive with the arc of engagement of said scraper means with said shaft, for preventing passage of lubricant longitudinally of the shaft.

2. For use with a rotating lubricated shaft, an oil scraper having an arcuate surface of extended length and of the same curvature as the shaft and suspended for gravity engagement throughout its length with the shaft, said surface bounded at one side by a wall having a very small helix angle and of substantial height throughout its length.

3. A lubricant scraper having a scraping flange of the same curvature as the shaft which it is to engage, said flange tapering gradually, in a direction circumferential of the shaft which it is to engage, in width of contact.

4. In combination, a rotating shaft, and means for scraping lubricant therefrom including a scraper engaging the shaft over a comparatively wide arc and having with the shaft an engagement gradually but progressively widening in the direction of rotation of the shaft throughout the entire arc of engagement.

5. As an article of manufacture, a lubricant scraper having a concave flange formed to the curvature of a shaft with which it is to cooperate and of a dimension circumferentially of the shaft at least several times its mean dimension lengthwise of the shaft and tapering in width from end to end and provided with beveled sides which diverge oppositely from a plane perpendicular to the shaft axis and cutting said flange at its point of minimum width.

6. As an article of manufacture, a lubricant scraper having leading and rearward ends and provided with an arcuate flange having a concave surface adapted to engage a shaft and having a lateral scraping edge making an angle of substantially less than 45° with a plane to which the axis of curvature of the flange is perpendicular and of at least as great height, radially of the shaft, at its rearward as at its leading end.

7. In combination, a rotating lubricated shaft having a bearing, and means for preventing passage of lubricant along said shaft beyond a desired point thereon including a device held against rotation with the shaft and engaging the latter due solely to its own weight, and having a surface whose opposite edges gradually diverge at a small angle bisected by a plane to which the axis of said shaft is perpendicular, said surface contacting with said shaft over an extended arc.

8. In combination, a rotating lubricated shaft and means for preventing passage of lubricant along said shaft beyond a desired point including a scraper having a lateral scraping edge making a small helix angle with a plane transverse to the shaft and of substantial height at its end last passed by a point on the shaft during rotation of the shaft, for deflecting lubricant in a direction longitudinally of said shaft at a rate so related to its rotative speed that said lubricant will be detached from said shaft at least in part by centrifugal force.

9. As an article of manufacture, a lubricant scraper having a arcuate surface conforming in curvature to a shaft to be scraped, and elongated circumferentially of said shaft and having another surface providing a scraping edge and extending to the inner side of said scraper and making a small helical angle with a plane perpendicular to the axis of the shaft to be scraped and extending, with substantial height, for the full length of said scraper in a circumferential direction.

10. As an article of manufacture, a lubricant scraper having a concave flange formed to the curvature of a shaft with which it is to cooperate and of a dimension circumferentially of the shaft at least several times its mean dimension lengthwise of the shaft and tapering in width from end to end and provided with sides which diverge oppositely from a plane perpendicular to the shaft axis and cutting said flange at its point of minimum width.

MADS MARTHINSEN.